US009445653B2

(12) United States Patent
Liu et al.

(10) Patent No.: US 9,445,653 B2
(45) Date of Patent: Sep. 20, 2016

(54) BLUETOOTH AUDIO

(71) Applicant: KEYSHEEN INDUSTRY(SHANGHAI) CO., LTD., Shanghai (CN)

(72) Inventors: Lausan Chung-Hsin Liu, Shanghai (CN); Shopo Hsin Tsu Liu, Shanghai (CN); Fibro Tsu Kun Liu, Shanghai (CN)

(73) Assignee: KEYSHEEN INDUSTRY (SHANGHAI) CO., LTD., Shanghai (CN)

( * ) Notice: Subject to any disclaimer, the term of this patent is extended or adjusted under 35 U.S.C. 154(b) by 25 days.

(21) Appl. No.: 14/479,851

(22) Filed: Sep. 8, 2014

(65) Prior Publication Data

US 2016/0066664 A1 Mar. 10, 2016

(51) Int. Cl.

*H04B 3/00* (2006.01)
*A45B 3/00* (2006.01)
*H04R 1/02* (2006.01)
*H04R 9/06* (2006.01)

(52) U.S. Cl.

CPC ................. *A45B 3/00* (2013.01); *H04R 1/025* (2013.01); *H04R 1/028* (2013.01); *A45B 2200/1009* (2013.01); *H04R 2420/07* (2013.01)

(58) Field of Classification Search

CPC .. H04R 1/025; H04R 1/028; H04R 2420/07; A45B 3/00; A45B 2200/1009

USPC ......... 381/77, 301, 322, 324, 334; 455/66.1, 455/41.2, 41.3, 572

See application file for complete search history.

(56) References Cited

U.S. PATENT DOCUMENTS

| | | | | |
|---|---|---|---|---|
| 7,134,762 | B2 | 11/2006 | Ma | |
| 7,497,583 | B2 | 3/2009 | Ma | |
| 2008/0118089 | A1* | 5/2008 | Li | G09F 27/00 381/124 |
| 2010/0124034 | A1* | 5/2010 | Shouyama | H05K 1/02 361/756 |

* cited by examiner

*Primary Examiner* — Ammar Hamid

(74) *Attorney, Agent, or Firm* — Muncy, Geissler, Olds & Lowe, P.C.

(57) ABSTRACT

A Bluetooth audio that can be selectively installed on an umbrella shaft of an umbrella includes an audio body, a coupling shell and a clamp device. The audio body includes an installation recess which has an installation space for installing the umbrella shaft. The installation recess has a closed end corresponding to the substantial center of the audio body and an open end located on an edge of the audio body and corresponding to the closed end. The coupling shell can be selectively placed in the installation space through the open end and installed in the installation recess to close the open end and confine the umbrella shaft at the closed end. The clamp device is located in the audio body corresponding to the closed end and operable by a user's hand to clamp the umbrella shaft.

13 Claims, 7 Drawing Sheets

BLUETOOTH AUDIO

FIELD OF THE INVENTION

The present invention relates to a Bluetooth audio and particularly to a Bluetooth audio that is selectively installable on an umbrella shaft of an umbrella.

BACKGROUND OF THE INVENTION

Outdoor activities are very popular these days. During holidays many people have flocked to parks or forests to be close to nature for a change. Various types of outdoor furniture also have been developed and marketed to suit this trend, such as parasols, folding tables and chairs, portable cooking facilities and the like. Take parasol as an example. It mainly provides a shade area for people to rest and fend off sunshine. The conventional parasols mostly provide merely sunshade function. Some vendors now have tried to attach furniture to the parasol to improve its usability.

For instance, U.S. Pat. Nos. 7,134,762 and 7,497,583 disclose a light providing apparatus attachable to umbrella. The light providing apparatus includes a body, a clamping device, a light source and a power supply unit. The body has an inner wall and an opening to hold the umbrella. The clamping device is located on the inner wall facing the opening with a front end movable against the inner wall through a spring. Thus the light providing apparatus can be attached to the umbrella. Although the aforesaid technique provides a clamping structure installable on the umbrella, the holding strength of the clamping device on the umbrella depends on the elastic force of the spring. In the event that the elastic force weakens the clamping device cannot securely clamp the umbrella, then the light providing apparatus could be shaking against the umbrella. Moreover, the clamping device and the umbrella of the aforesaid technique are in contact with each other for merely a small area, hence it still leaves a lot to be desired in terms of the force for anchoring on the umbrella.

SUMMARY OF THE INVENTION

The primary object of the present invention is to solve the problem of the conventional structure of unable to provide steady holding on the umbrella.

To achieve the foregoing object the present invention provides a Bluetooth audio that can be selectively installed on an umbrella shaft of an umbrella. The Bluetooth audio includes an audio body, a coupling shell and a clamp device. The audio body includes an installation recess which has an installation space for installing the umbrella shaft, a housing space formed inside, a Bluetooth module located in the housing space to form information link with an external electronic device through a Bluetooth file transmission protocol to receive an audio signal, a loudspeaker module to form information link with the Bluetooth module to receive the audio signal and output music, and at least one first power terminal located on one side of the installation recess and faced the installation space to form electrical connection with the Bluetooth module. The installation recess has a closed end corresponding to the substantial center of the audio body and an open end located at the edge of the audio body corresponding to the closed end. The coupling shell can be selectively placed in the installation space through the open end and installed in the installation recess to close the open end to confine and position the umbrella shaft at the closed end. The coupling shell includes a power supply module disposed therein to store working power and a second power terminal electrically connected to the power supply module and formed electrical contact with the first power terminal when the coupling shell is installed in the installation recess to supply the working power stored in the power supply module to the Bluetooth module and the loudspeaker module. The clamp device is located on the audio body corresponding to the closed end and includes a clamp member located in the installation space and controllable to slide to a first position or a second position to release or clamp the umbrella shaft, and an operation member connected to the clamp member and operable by a user's hand to move the clamp member.

In one aspect the audio body has a first surface faced an umbrella panel of the umbrella and a second surface remote from the umbrella panel.

In another aspect the clamp device is located on the first surface of the audio body.

In yet another aspect the audio body includes a plurality of lighting elements disposed on the second surface and received the working power from the first power terminal to emit light.

In yet another aspect the lighting elements are located annularly on the edge of the audio body.

In yet another aspect the Bluetooth module and the lighting elements are located on a same circuit board.

In yet another aspect the audio body has an installation cavity on the second surface to hold the clamp device.

In yet another aspect the operation member includes a poking portion exposed outside of the first surface and operable by a user and the audio body has a confining track to confine a movement of the poking portion when operated by the user.

In yet another aspect the clamp member includes a first segment fixedly located in the installation recess, a second segment hinged on the first segment and capable of sliding between the first position and the second position, and an elastic element abutting respectively the first segment and the second segment to provide a return force to position the second segment at the first position in normal conditions.

In yet another aspect the first segment has a first elastic pad at one side facing the second segment, and the second segment has a second elastic pad at one side thereof facing the first segment.

In yet another aspect the audio body has a loudspeaker opening formed on the second surface corresponding to the loudspeaker module to output music outside the audio body.

In yet another aspect the audio body includes a first half shell and a second half shell that are coupled with each other.

In yet another aspect the audio body has at least one confining cavity on one side of the installation recess facing the installation space, and the coupling shell has at least one latch member to latch in the confining cavity to form a confining relationship between therewith when the coupling shell is installed in the installation recess.

In yet another aspect the coupling shell has an operation button connected to the latch member that is operable by the user to release the confining relationship between the latch member and the confining cavity.

Through the structure set forth above, compared with the conventional techniques, the invention provides features as follows:

With the clamp member operable by user's hand, and the clamp member formed surface contact with the umbrella shaft after installation, the audio body can be securely installed on the umbrella shaft.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
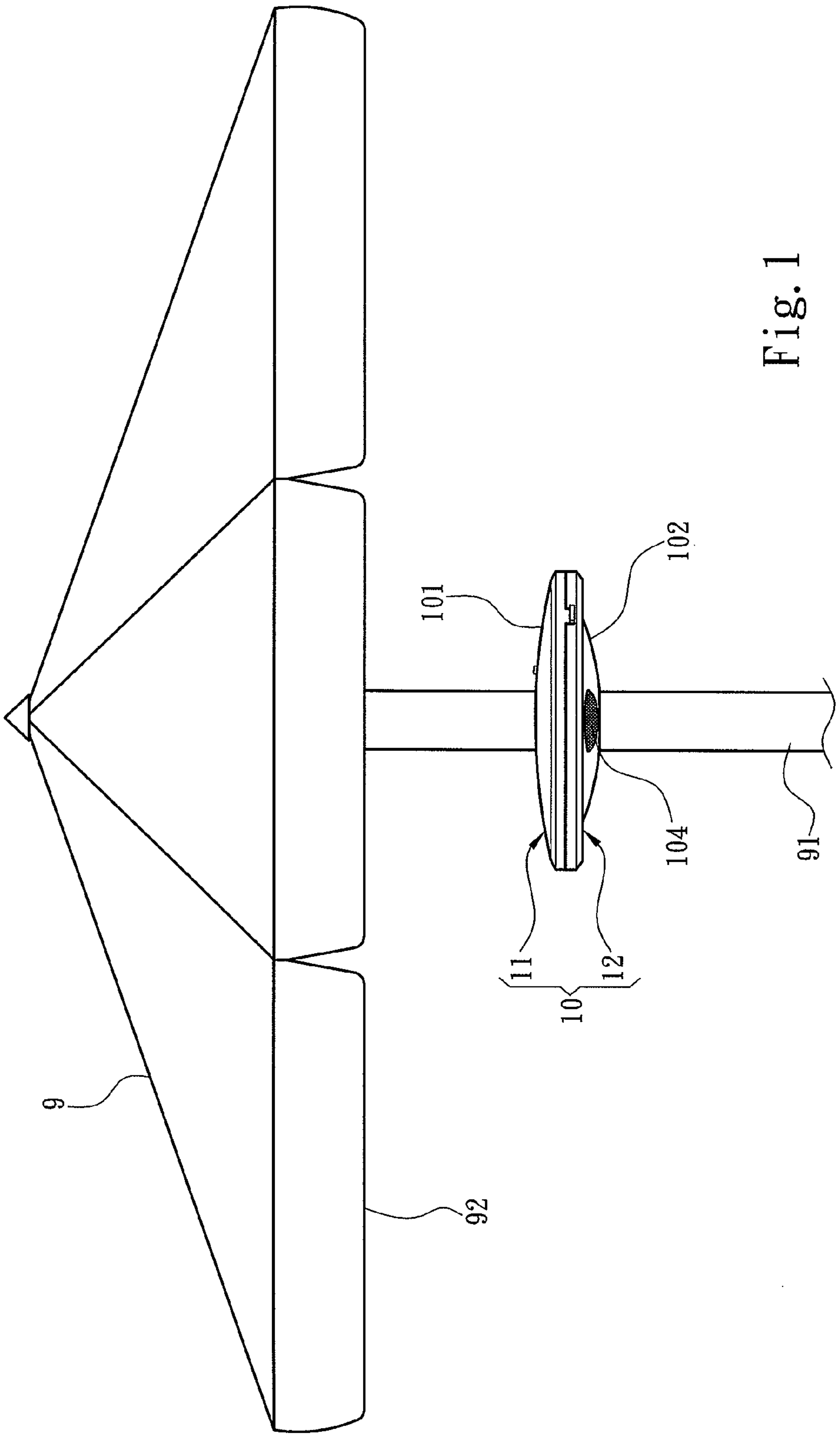
FIG. 1 is a schematic view of an embodiment of the invention in an implementation condition.
Figure 2:
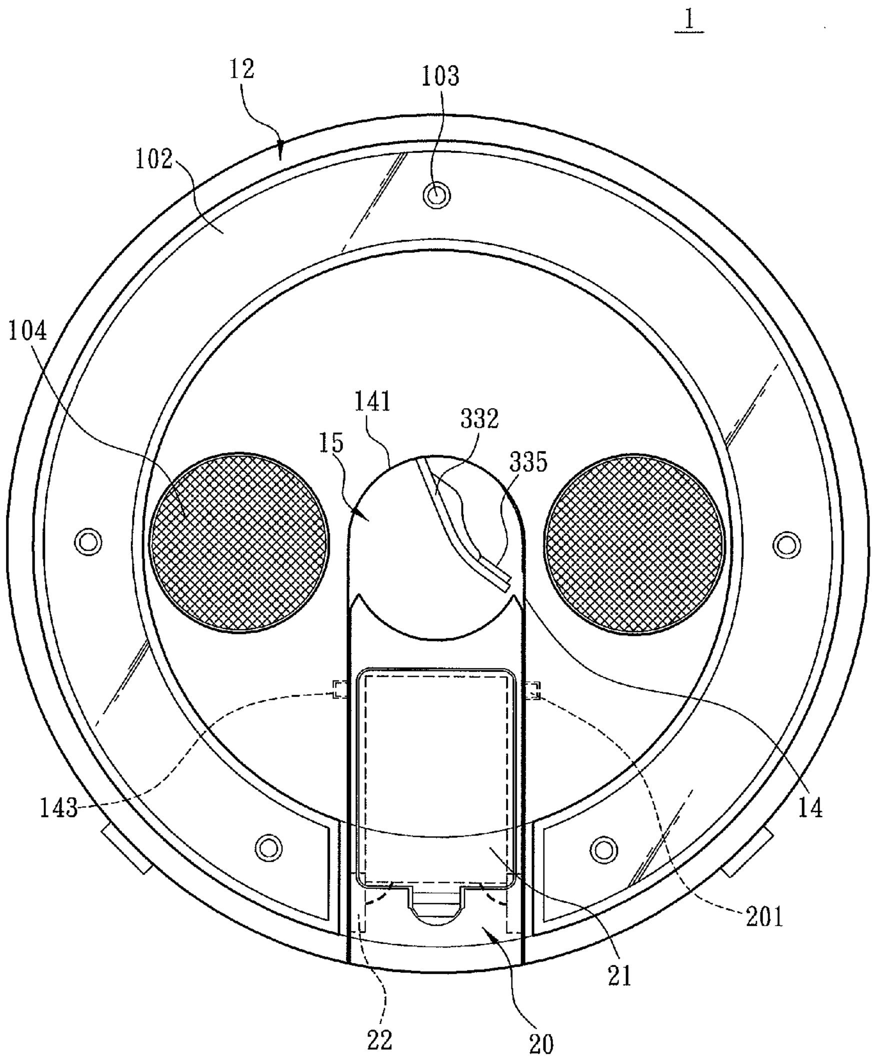
FIG. 2 is fragmentary schematic view-1 of the structure of an embodiment of the invention.
Figure 3:
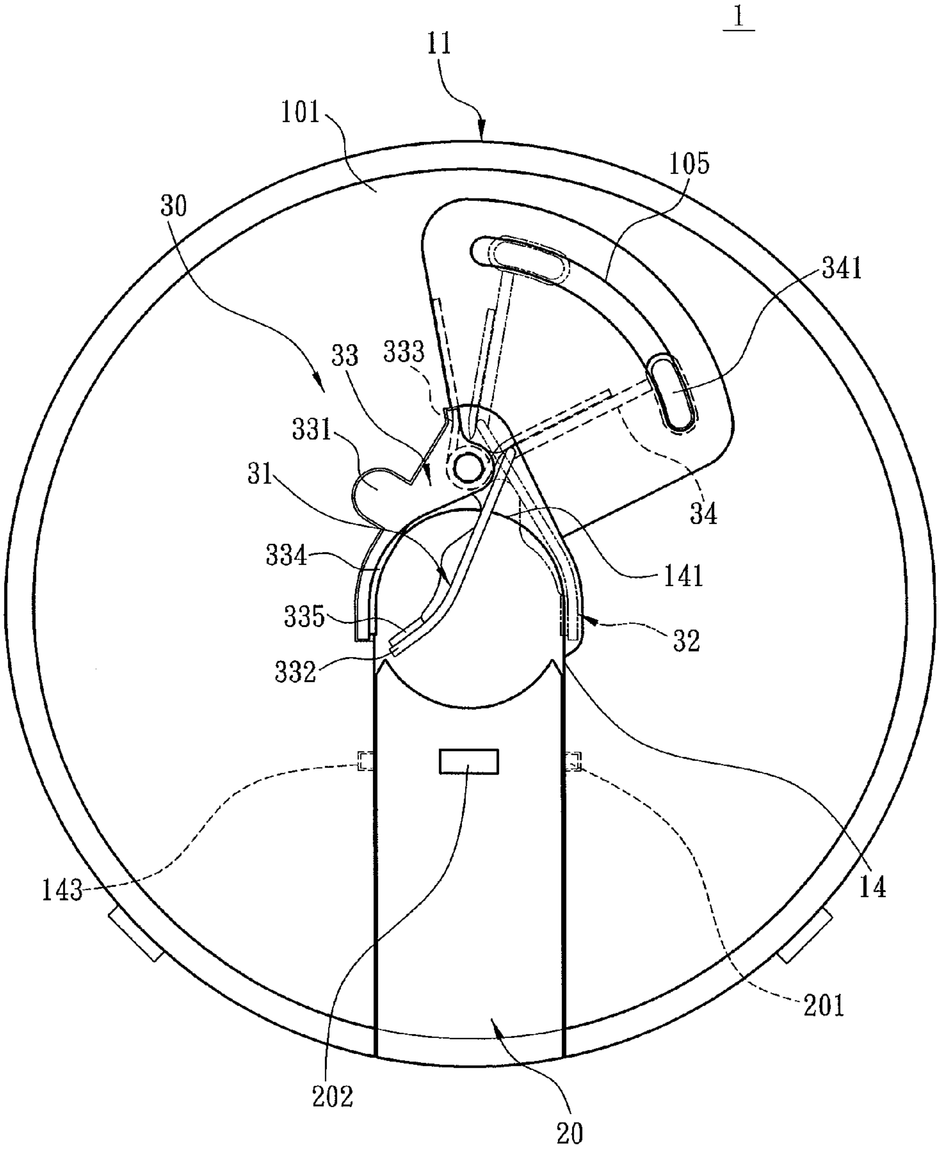
FIG. 3 is fragmentary schematic view-2 of the structure of an embodiment of the invention.
Figure 4:
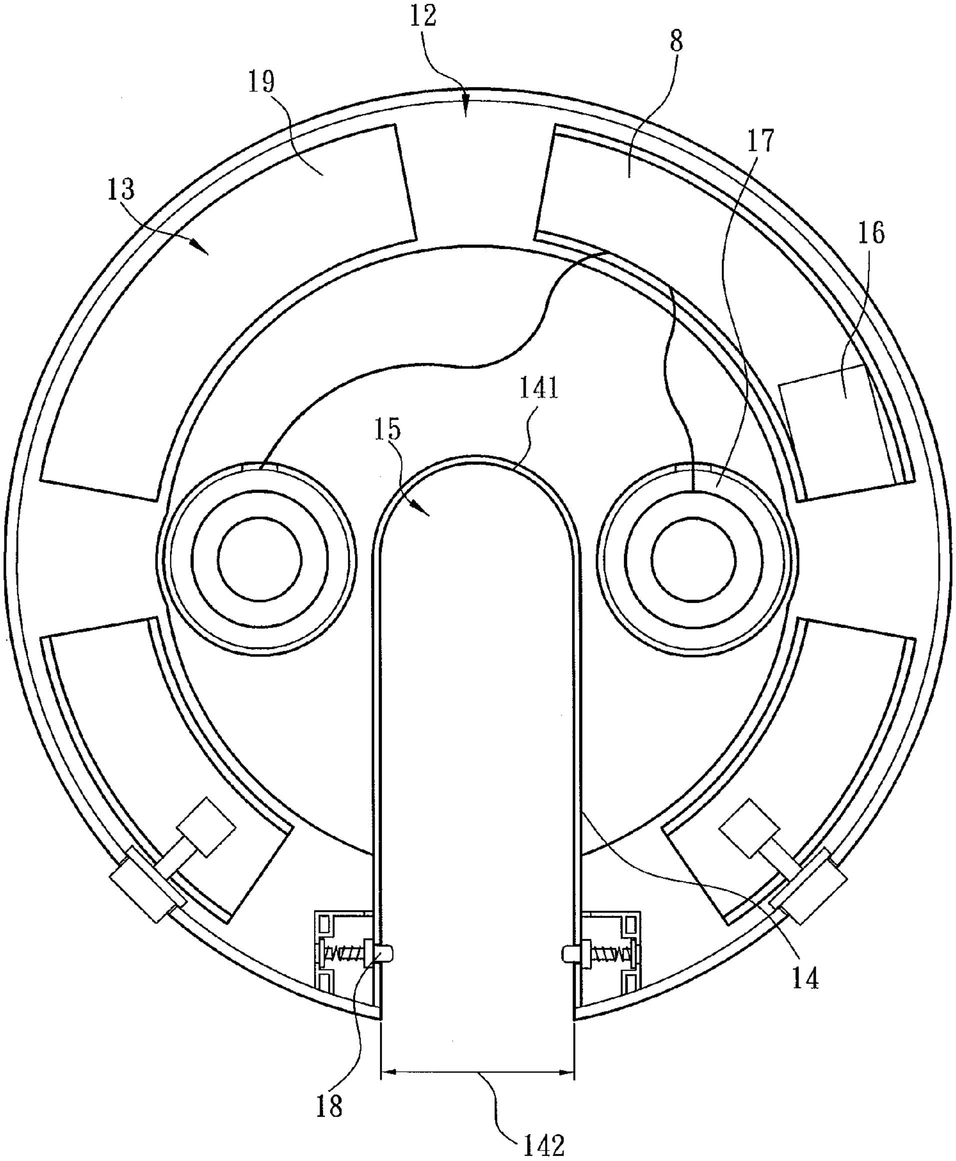
FIG. 4 is fragmentary schematic view-3 of the structure of an embodiment of the invention.

Please referring to FIGS. 1 through 4, the present invention aims to provide a Bluetooth audio 1 which can be selectively installed on an umbrella shaft 91 of an umbrella 9. The Bluetooth audio 1 includes an audio body 10, a coupling shell 20 and a clamp device 30. The audio body 10 can be formed by coupling a first half shell 11 and a second half shell 12 with each other, and includes a housing space 13, an installation recess 14 to form an installation space 15 for installing the umbrella shaft 91, a Bluetooth module 16 located in the housing space 13, a loudspeaker module 17 connected to the Bluetooth module 16, and at least one first power terminal 18 located on one side of the installation recess 14 and faced the installation space 15 to form electrical connection with the Bluetooth module 16. More specifically, the audio body 10 has a first surface 101 faced an umbrella panel 92 of the umbrella 9, and a second surface 102 remote from the umbrella panel 92. The audio body 10 also has a plurality of lighting elements 103 scattered on the second surface 102 to get working power from the first power terminal 18 to emit light. In one embodiment the lighting elements 103 are located annularly on the edge of the audio body 10. The lighting elements 103 can be located on a same circuit board 8 with the Bluetooth module 16. The circuit board 8 can be adjusted according to the profile of the audio body 10. For instance, in the event that the audio body 10 is circular, the circuit board 8 can be formed in an arched shape to mate the audio body 10. Moreover, the installation recess 14 has a closed end 141 corresponding to the substantial center of the audio body 10 and an open end 142 located on the edge of the audio body 10 corresponding to the closed end 141. The Bluetooth module 16 forms an information link with an external electronic device (not shown in the drawings) through a Bluetooth file transmission protocol to receive an audio signal. The external electronic device can be a notebook computer, a handheld mobile phone or the like. The loudspeaker module 17 forms another information link with the Bluetooth module 16 via an electric line to receive the audio signal to intensify sound and output music. In addition, the audio body 10 has a loudspeaker opening 104 on the second surface 102 corresponding to the loudspeaker module 17 to output the music outside the audio body 10.

In practice, the coupling shell 20 can be designed according to the profile of the installation recess 14 so that it can be selectively placed in the installation space 15 via the open end 142 and installed in the installation recess 14 to close the open end 142 and confine the umbrella shaft 91 at the closed end 141. The coupling shell 20 has a power supply module 21 located inside to store working power, and a second power terminal 22 electrically connected to the power supply module 21 and formed electric contact with the first power terminal 18 when the coupling shell 20 is installed in the installation recess 14 to supply the stored working power from the power supply module 21 to the Bluetooth module 16 and the loudspeaker module 17. Furthermore, the power supply module 21 can be a battery to provide the working power. In addition, the coupling shell 20 can also be selectively coupled with the installation recess 14. In order to confine the coupling shell 20 in the installation recess 14 at a desired position, in one embodiment the audio body 10 has at least one confining cavity 143, and the coupling shell 20 has at least one latch member 201. The confining cavity 143 is located on one side of the installation recess 14 facing the installation space 15. The latch member 201 corresponds to the confining cavity 143 to form a confining relationship therewith when the coupling shell 20 is installed in the installation space 15. Namely, when the coupling shell 20 is sliding in the installation space 15 the latch member 201 sinks into the confining cavity 143 so that the coupling shell 20 cannot continuously slide and is confined at a desired position. In addition, the coupling shell 20 further has an operation button 202 connected to the latch member 201 to be operated by a user to release the confining relationship between the latch member 201 and the confining cavity 143. More specifically, the latch member 201 and the operation button 201 can be linked in movement through a mechanical structure. In one embodiment the latch member 201 can be driven by the operation button 202 to move reciprocally against the surface of the coupling shell 20. Thus, when the operation button 202 is operated by the user it drives the latch member 201 away from the confining cavity 143 and escaping therefrom so that coupling shell 20 is movable again in the installation space 15.

Also referring to FIGS. 1 through 4 again, the clamp device 30 is located on the audio body 10 corresponding to the closed end 141 of the installation recess 14. More specifically, the clamp device 30 is located on the first surface 101 of the audio body 10, and includes a clamp member 33 located in the installation space 15 and controllable to slide between a first position 31 and a second position 32, and an operation member 34 connected to the clamp member 33 and operable by user's hand to drive the clamp member 33. Furthermore, the first position 31 means the location of the clamp member 33 in the installation space 15, and the second position 32 means the clamp member 33 is moved and skewed to one side of the installation recess 14 to release the umbrella shaft 91. In addition, the clamp member 33 has a first segment 331 fixedly located in the installation recess 14, a second segment 332 hinged on the first segment 331 and capable of sliding between the first position 31 and the second position 32, and an elastic element 333 to abut the first segment 331 and the second segment 332 and provide a return force to position the second segment 332 at the first position in normal conditions. In another embodiment the first segment 331 has a first elastic pad 334 at one side facing the second segment 332, and the second segment 332 has a second elastic pad 335 at one side facing the first segment 331. When the first elastic pad 334 and the second elastic pad 335 are in contact with the umbrella shaft 91 a friction force is generated to securely hold the Bluetooth audio 1 on the umbrella shaft 91. The first elastic pad 334 and the second elastic pad 335 can be rubber products. In yet another embodiment the audio body 10 has an installation cavity 19 on the second surface 102 to hold the clamp device 30. The installation cavity 19 makes the clamp device 30 at an elevation same as the second surface 102 upon being placed therein so that the clamp device 30 does not notably expose outside the Bluetooth audio 1 to enhance appeal of the Bluetooth audio 1. In addition, in yet another embodiment the operation member 34 has a poking portion 341 exposed outside the first surface 101 and operable by the user, and the audio body 10 has a confining track 105 to confine the movement locus of the poking portion 341 when it is operated by the user.

Figure 5A:
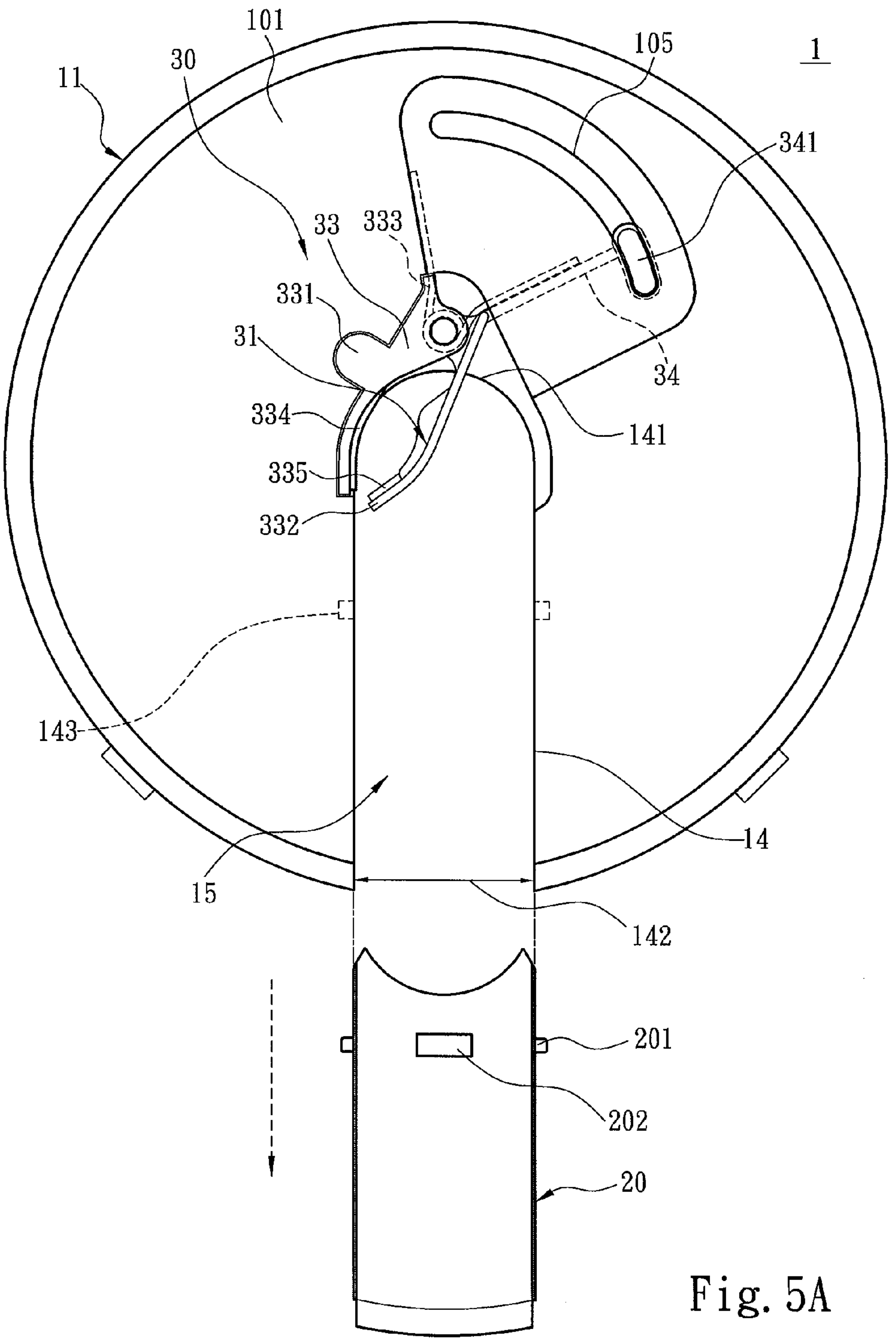
FIG. 5A is schematic view-1 of the assembly process of an embodiment of the invention.
Figure 5B:
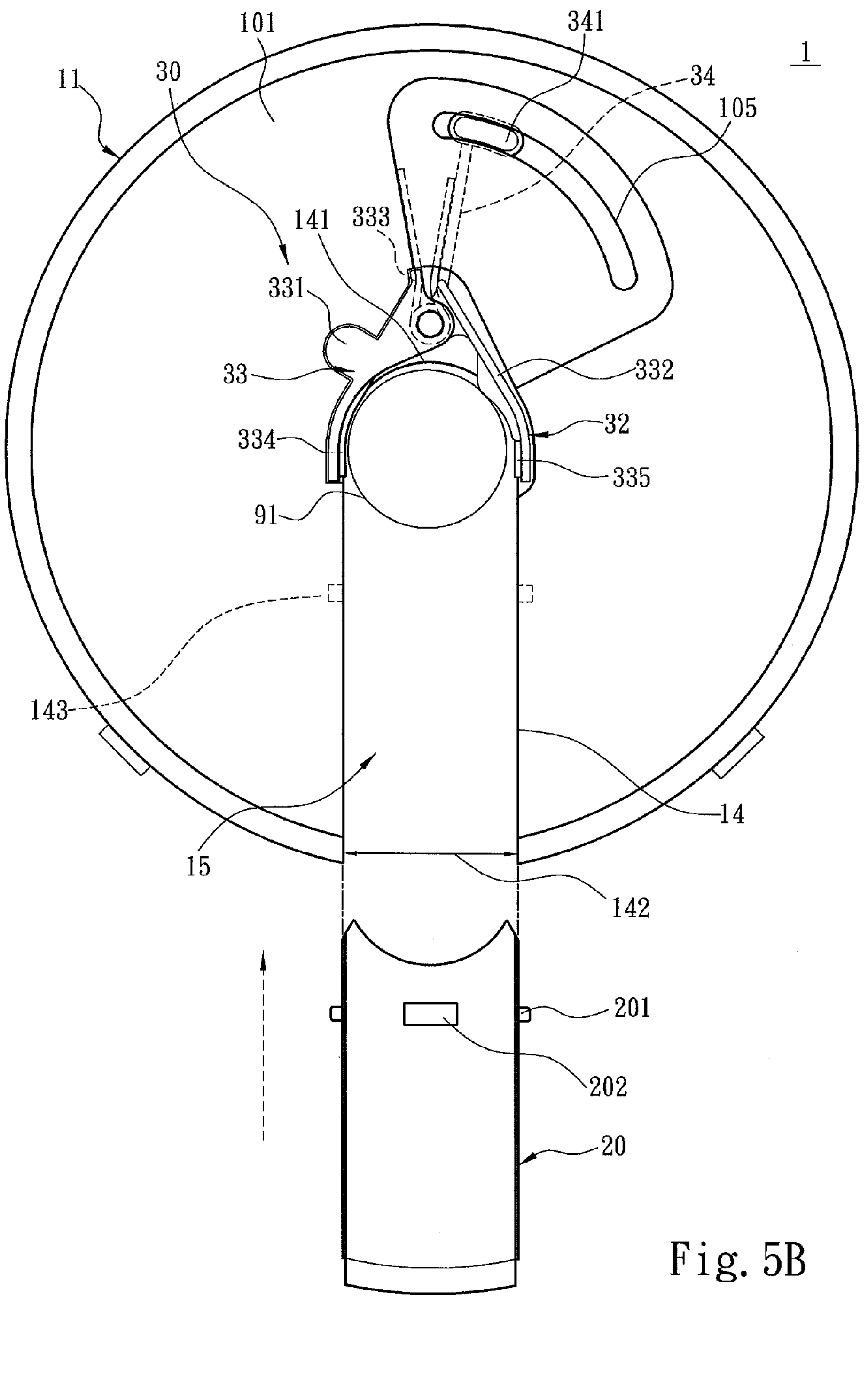
FIG. 5B is schematic view-2 of the assembly process of an embodiment of the invention.
Figure 5C:
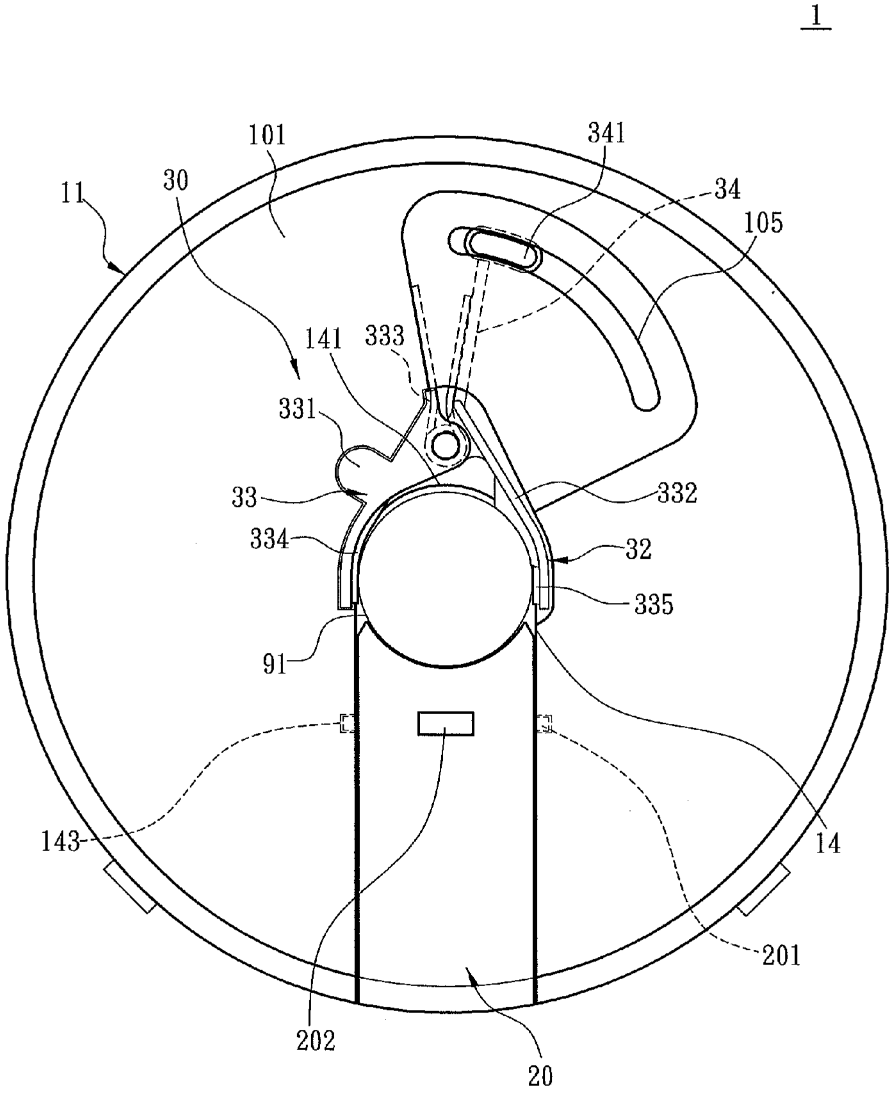
FIG. 5C is schematic view-3 of the assembly process of an embodiment of the invention.

Please referring to FIGS. 1 and 5A through 5C, the Bluetooth audio 1 can be installed on the umbrella shaft 91 of different diameters. During assembly, first, separate the coupling shell 20 and the audio body 10 to release the closed installation space 15; next, place the umbrella shaft 91 in the installation space 15 through the open end 142, meanwhile user maneuvers the operation member 34 to move the clamp member 33 temporarily from the first position 31 to the second position 32; then moves the operation member 34 again after the umbrella shaft 91 is held at the closed end 141 of the installation space 15 to move the clamp member 33 from the second position 32 to the first position 31; during moving of the clamp member 33 to the first position 31, it clamps the umbrella shaft 91 so that the second segment 332 forms surface contact with the umbrella shaft 91 to securely hold the audio body 10 on the umbrella shaft 91. Then the coupling shell 20 can be placed into the installation space 15 through the open end 142 with the front end thereof abutting the umbrella shaft 91, thereby the umbrella shaft 91 is firmly confined by the closed end 142 of the installation space 15. As a result, the Bluetooth audio 1 can be installed on the umbrella shaft 91.

As a conclusion, the Bluetooth audio of the invention can be selectively installed on an umbrella shaft, and includes an audio body, a coupling shell and a clamp device. The audio body has an installation recess to form an installation space and allow the umbrella shaft to be installed inside. The installation recess has a closed end corresponding to the substantial center of the audio body and an open end corresponding to the closed end and located at the edge of the audio body. The coupling shell can selectively enter installation space through the open end and be installed in the installation recess to close the open end and confine the umbrella shaft at the closed end. The clamp device is located in the audio body corresponding to the closed end and is operable by a user to clamp the umbrella shaft, thereby the Bluetooth audio can be securely held on the umbrella shaft.

What is claimed is:

1. A Bluetooth audio device selectively installable on an umbrella shaft of an umbrella, comprising:

an audio body including an installation recess which includes an installation space to allow the umbrella shaft installed therein, a housing space formed therein, a Bluetooth module located in the housing space and forming information link with an external electronic device through a Bluetooth file transmission protocol to receive an audio signal, a loudspeaker module forming information link with the Bluetooth module to receive the audio signal and output music, and at least one first power terminal located at one side of the installation recess and facing the installation space to form electrical connection with the Bluetooth module; wherein the installation recess includes a closed end corresponding to a substantial center of the audio body and an open end located on an edge of the audio body and corresponding to the closed end;

a coupling shell which is selectively placed in the installation space through the open end and installed in the installation recess to close the open end and confine the umbrella shaft at the closed end, and includes a power supply module disposed therein to store working power and a second power terminal which is electrically connected to the power supply module and forms electric contact with the first power terminal when the coupling shell is installed in the installation recess to supply the working power stored in the power supply module to the Bluetooth module and the loudspeaker module via the first power terminal; and a clamp device which is located in the audio body and corresponding to the closed end of the installation recess, and includes a clamp member located in the installation space and controllable to slide to a first position or a second position to release or clamp the umbrella shaft and an operation member connected to the clamp member and operable by a user's hand to move the clamp member, wherein the clamp member includes a first segment fixed in the audio body and located in the installation recess, a second segment which is disposed in the audio body hinged on the first segment and capable of sliding between the first position and the second position, and an elastic element abutting the first segment and the second segment to provide a return force to position the second segment at the first position in regular conditions.

2. The Bluetooth audio device of claim 1, wherein the audio body includes a first surface facing an umbrella panel of the umbrella and a second surface remote from the umbrella panel.

3. The Bluetooth audio device of claim 2, wherein the clamp device is located on the first surface of the audio body.

4. The Bluetooth audio device of claim 3, wherein the audio body includes a plurality of lighting elements disposed on the second surface and receiving the working power from the first power terminal to emit light.

5. The Bluetooth audio device of claim 4, wherein the lighting elements are located annularly on the edge of the audio body.

6. The Bluetooth audio device of claim 4, wherein the Bluetooth module and the lighting elements are located on a same circuit board.

7. The Bluetooth audio device of claim 2, wherein the audio body includes an installation cavity on the second surface to hold the clamp device.

8. The Bluetooth audio device of claim 2, wherein the operation member includes a poking portion exposed outside the first surface and operable by a user, and the audio body includes a confining track to confine a movement of the poking portion operated by the user.

9. The Bluetooth audio device of claim 1, wherein the first segment includes a first elastic pad at one side thereof facing the second segment, and the second segment includes a second elastic pad at one side thereof facing the first segment.

10. The Bluetooth audio device of claim 2, wherein the audio body includes a loudspeaker opening on the second surface corresponding to the loudspeaker module to output music outside the audio body.

11. The Bluetooth audio device of claim 1, wherein the audio body includes a first half shell and a second half shell that are coupled with each other.

12. The Bluetooth audio device of claim 1, wherein the audio body includes at least one confining cavity on one side of the installation recess facing the installation space, the coupling shell including at least one latch member to latch in the confining cavity to form a confining relationship therewith when the coupling shell is installed in the installation recess.

13. The Bluetooth audio device of claim 12, wherein the coupling shell includes an operation button connected to the latch member and operable by a user to release the confining relationship between the latch member and the confining cavity.

* * * * *